(12) United States Patent
Lofftus et al.

(10) Patent No.: US 9,958,700 B2
(45) Date of Patent: May 1, 2018

(54) OPTICAL MODULATOR FOR LASER SPECKLE REDUCTION

(71) Applicant: Eastman Kodak Company, Rochester, NY (US)

(72) Inventors: Kevin D. Lofftus, Fairport, NY (US); Paul James Kane, Rochester, NY (US); James Henry Reynolds, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 214 days.

(21) Appl. No.: 14/813,434

(22) Filed: Jul. 30, 2015

(65) Prior Publication Data

US 2017/0031172 A1    Feb. 2, 2017

(51) Int. Cl.
| | |
|---|---|
| G02B 27/48 | (2006.01) |
| G02F 1/01 | (2006.01) |
| G03B 21/56 | (2006.01) |
| G03B 21/20 | (2006.01) |
| G02B 5/02 | (2006.01) |

(52) U.S. Cl.
CPC .......... *G02B 27/48* (2013.01); *G02F 1/0128* (2013.01); *G03B 21/208* (2013.01); *G03B 21/2033* (2013.01); *G03B 21/562* (2013.01); *G02B 5/0236* (2013.01)

(58) Field of Classification Search
CPC .... G03B 21/56; G03B 21/147; G03B 21/562; G02B 27/48
USPC ......................................................... 359/446
See application file for complete search history.

(56) References Cited

U.S. PATENT DOCUMENTS

| | | | |
|---|---|---|---|
| 5,902,711 A | 5/1999 | Smith et al. | |
| 6,122,023 A | 9/2000 | Chen et al. | |
| 8,410,239 B2 | 4/2013 | Blanc et al. | |
| 8,500,287 B2 | 8/2013 | Moussa | |
| 8,553,341 B2 | 10/2013 | Aschwanden | |
| 8,724,218 B2 | 5/2014 | Curtis et al. | |
| 8,902,520 B2 | 12/2014 | Aschwanden | |
| 9,029,431 B2 | 5/2015 | Nair et al. | |
| 9,235,060 B2 * | 1/2016 | Tong | G02B 27/48 |
| 2005/0073640 A1 * | 4/2005 | Dunn | G02F 1/133308 |
| | | | 349/161 |

(Continued)

FOREIGN PATENT DOCUMENTS

GB     1327705 A  *  8/1973  ........... G02B 5/0252

OTHER PUBLICATIONS

Kelly & O'Neill, Liquid Crystal for Elector-Optic Applications, 2000, Handbook of Advanced Electronic and Photonic Materials and Devices vol. 7: Liquid Crystals, Display and Laser Materials, Academic Press.*

(Continued)

*Primary Examiner* — Christopher Mahoney
(74) *Attorney, Agent, or Firm* — David A. Novais; Neson A. Blish

(57) ABSTRACT

An optical modulator (12) for speckle suppression in a laser projection system includes a first planar transparent conductor (20); a second optionally transparent planar conductor (26); a diffusing element (22) disposed between the first and second conductor; and an alternating voltage applied across the first and second conductors creates in-plane movement or distortion in the diffusing element to reduce laser speckle.

17 Claims, 4 Drawing Sheets

(56) References Cited

U.S. PATENT DOCUMENTS

| | | | |
|---|---|---|---|
| 2006/0187385 A1* | 8/2006 | Liao | G02F 1/133305 |
| | | | 349/114 |
| 2010/0067088 A1* | 3/2010 | Novotny | H04N 9/3161 |
| | | | 359/246 |
| 2014/0203953 A1* | 7/2014 | Moser | G06F 3/0202 |
| | | | 341/27 |

OTHER PUBLICATIONS

Andrew B. Watson, "A formula for the mean human optical modulation transfer function as a function of pupil size", *Journal of Vision*, May 2013, vol. 13(6), 18, pp. 1-11.

Stijn Roelandt et al., "Standardized speckle measurement method matched to human speckle perception in laser projection systems", Optics Express, vol. 20, No. 8, Apr. 2012, pp. 8770-8783.

\* cited by examiner

OPTICAL MODULATOR FOR LASER SPECKLE REDUCTION

FIELD OF THE INVENTION

The invention relates in general to laser projection of digital images and in particular to reducing speckle in the projected image.

BACKGROUND OF THE INVENTION

When laser light is reflected from a surface such as paper, a wall or a projection screen, a high contrast, fine scale granular pattern called laser speckle is seen by an observer looking at the illuminated spot. From the earliest days of lasers, the cause of speckle was recognized to be the fact that most materials are randomly rough on the scale of an optical wavelength, with the exception of highly polished surfaces such as mirrors. Upon reflection from a rough surface, different facets contribute elementary wavelets with slightly different optical path lengths that interfere with each other upon propagation, producing the high contrast, fine scale speckle pattern. The statistics of the light intensity in the speckle pattern can be related to the statistics of the rough surface, the size of the scattering spot, the wavelength of the light, and other parameters of the illuminating beam. The speckle phenomenon is not confined to visible light, and is well known in radar and other regions of the electromagnetic spectrum. In fact, speckle is a fundamental part of any wave or field phenomenon, and is also well known in applications such as ultrasound, and even in the study of gravitational fields in astrophysics.

Because of the sensitivity of laser imaging systems to speckle, it is useful in the metrology or characterization of rough surfaces, or other scattering objects such as small particles. In image formation, however, speckle is a noise source that interferes with the image or signal information, and must be reduced or eliminated. In particular, in laser projection systems used in near-to-eye, office or theatre environments, it is critical that speckle be minimized so that it does not interfere with the clarity or enjoyment of the image. Many methods have been suggested in the prior art to reduce speckle in projection imaging systems. They can be divided roughly into two classes: 1) methods pertaining to reduction of speckle at the projection source and 2) methods pertaining to reduction of speckle at the projection screen or surface where the final image is formed. All classic methods of speckle reduction involve an averaging process, as explained in the text "Speckle Phenomena in Optics", by J. W. Goodman, Roberts and Co., Englewood Colo., 2007. That is, a number of statistically independent speckle patterns must be either simultaneously averaged, or averaged within a time period shorter than the response time of the human eye. Methods reviewed by Goodman include averaging over wavelength (increasing the bandwidth of the optical system), averaging over time (using a moving diffuser or changing phase mask in the projector) and overdesign of the projection optics relative to the eye (averaging many projector blur spots within a single eye blur spot).

A successful laser projection system can apply multiple methods of speckle reduction, at both source and screen, since most methods fail to eliminate speckle entirely in a single step. Speckle is characterized by the mean intensity $\langle I \rangle$ and standard deviation $\sigma_I$ of its intensity (I), which are combined into a single metric of speckle contrast C:

$$C = \frac{\sigma_I}{\langle I \rangle}, \tag{1}$$

where $0 \le C \le 1$. This can also be expressed as a percent. Each method of speckle reduction is as good as the effective number of statistically independent speckle patterns it generates. Here "effective" means the number of statistically independent patterns generated within the integration or response time of the eye, detector or camera used to observe them. If reduction method i generates $N_i$ independent patterns, it contributes a factor $1/\sqrt{N_i}$ to the overall speckle reduction. If M methods are used in total, the overall speckle reduction factor R is $$R = \left[ \prod_{i=1}^{M} N_i \right]^{1/2}, \tag{2}$$

so that the reduced speckle contrast is $$C' = C/R. \tag{3}$$

As mentioned earlier, one method of generating multiple speckle patterns is to use a moving diffuser or changing phase screen in projector, or in the optical beam between the projector and screen. In a well-known method, a rotating diffuser or phase plate is placed in the beam of a projection system either in the projection optics, or between the projector and the screen, so that the imaging beam suffers random phase delays across its extent. A fixed diffuser would merely lead to a slightly different speckle pattern than if it were absent. However, by moving the diffuser plate or phase plate, a series of speckle patterns is created. If the plate is moved rapidly and through a sufficient distance, enough independent speckle patterns are generated to reduce the overall noise.

Other methods of speckle reduction between the projector and screen are directed towards reducing the bulk of the diffuser mechanism. For example, U.S. Pat. No. 8,500,287 (Moussa) describes a device based on a piezoelectric actuator, in which a diffuser is fixed inside a vibrating metallic frame. The frame moves the diffuser laterally, i.e. in the plane of the frame. In another example, U.S. Pat. Nos. 8,553,341 and 8,902,520 (both to Aschwanden) describe an electroactive optical device suitable for inclusion in the optical beam between the projector and the screen. The device is comprised of a pre-stretched polymer film with electrodes on both surfaces, and a rigid optical element (such as a diffuser) connected to either surface or the polymer film. The application of a voltage to the electrodes displaces the optical element along the plane of the polymer film, due to Coulomb forces. In-plane displacements of a diffuser or phase plate are used to create a series of independent speckle patterns. The in-plane displacements by be rotational or lateral in the x and y directions. Out-of-plane movements in the z direction are disclosed in U.S. Pat. No. 8,500,287 as bending the plate across the full width of the image beam causing image distortion and loss of image sharpness as the speckle reduction averaging process also averages the distortions. Problems with the placement of moving diffusers into the beam optics include scatter from the diffuser reducing the sharpness of the focused image, or creating haze in the image. Reduction of the diffusive properties of the diffuser to reduce haze in the image can render the diffuser ineffective in reducing speckle as demonstrated in comparative EXAMPLE 1. While the loss of image sharpness can be eliminated by positioning of the diffuser and optical modulator before the beam-shaping element of an imaging system and focusing the dispersed beam onto the beam-shaping element, the effect of the optical modulator is reduced or eliminated as demonstrated in comparative EXAMPLE 2. The loss of image sharpness and hazing cause by diffusers can be reduced by placing a diffuser closer to the screen, or nearly in contact, but then the diffuser becomes very large and hard to move laterally.

This leads to the second class of speckle reduction methods, directed towards improvements to the projection screen. In one example, U.S. Pat. No. 6,122,023 (Chen et. al.) describes a liquid crystal projection display screen constructed in a highly scattering state. The display includes a plurality of liquid crystal spheres. When no voltage is applied, the medium is highly scattering and the screen is opaque. When a voltage is applied, the liquid crystal molecules are aligned and the light is transmitted. When the voltage is varied with a 60 Hz signal, the spheres vibrate, causing a varying speckle pattern which the eye averages. In another example, U.S. Pat. No. 8,724,218 (Curtis et. al.) describes speckle reduction using mechanical vibration of the screen. Devices near, but not in contact with, the screen generate acoustic or electromagnetic waves that couple to the screen and produce mechanical vibrations, creating a changing speckle pattern. The screen vibration may occur in all of the x, y and z directions, that is to say movement in the x and y directions are lateral movements in the plane of the screen and movement in the z direction are axial movements perpendicular to the screen. Such mechanical vibration methods must be carefully tuned to avoid standing wave patterns and regions of uneven or zero vibration. None of the speckle reduction methods cited report quantitative performance results, or discuss their potential impact on image sharpness. There is still a need, therefore, for additional methods of laser speckle reduction in projection systems.

SUMMARY OF THE INVENTION

An active diffuser for laser projection systems comprising a separation layer between two planar conductors and a diffuser material disposed upon at least one of the surfaces of one of the conductors or dispersed throughout the separation layer whereby the separation layer is either compressible or causes axial deformation in one of the conductors when a voltage is applied across the two conductors. At least one of the planar conductors is transparent. Applying an alternating voltage across the conductors expands and compresses the separation layer, creating a "moving diffuser". This action reduces undesirable static interference patterns that create multiple light paths known as laser speckle.

In a preferred embodiment of the present invention, the moving diffuser is placed close to, or nearly in contact with the screen thereby retaining a sharp image without haze. The screen may be front-lit when viewed from the same side as the projector or back-lit when viewed from the opposite side as the projector.

A feature of the present invention is movement of the diffuser along the axis of the projected image without lateral movement that may cause standing wave patterns with no speckle reduction.

The present invention may be combined with other methods of speckle reduction to increase the overall reduction of speckle.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

The present invention is described below in the environment of a laser projection system.

Figure 1:
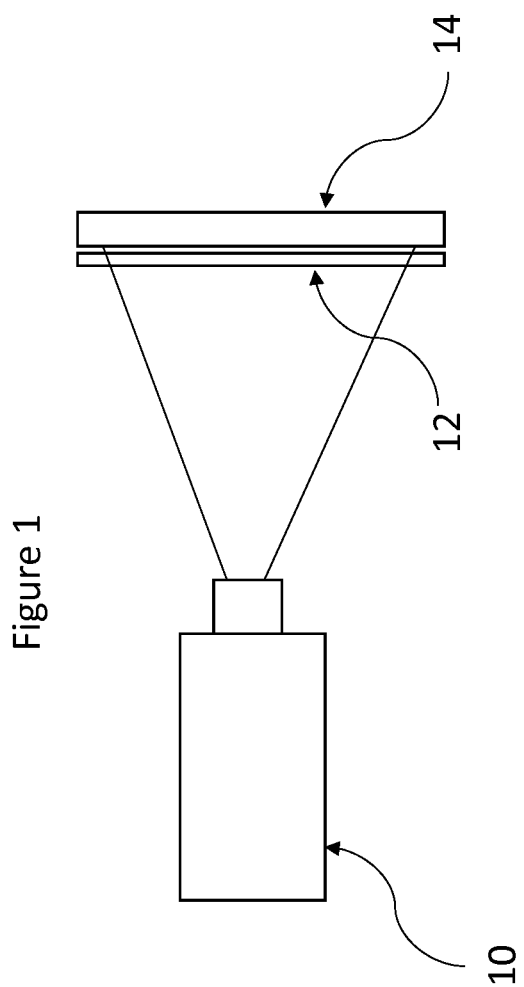
FIG. 1 is a perspective view of a laser projection system.
Figure 2:
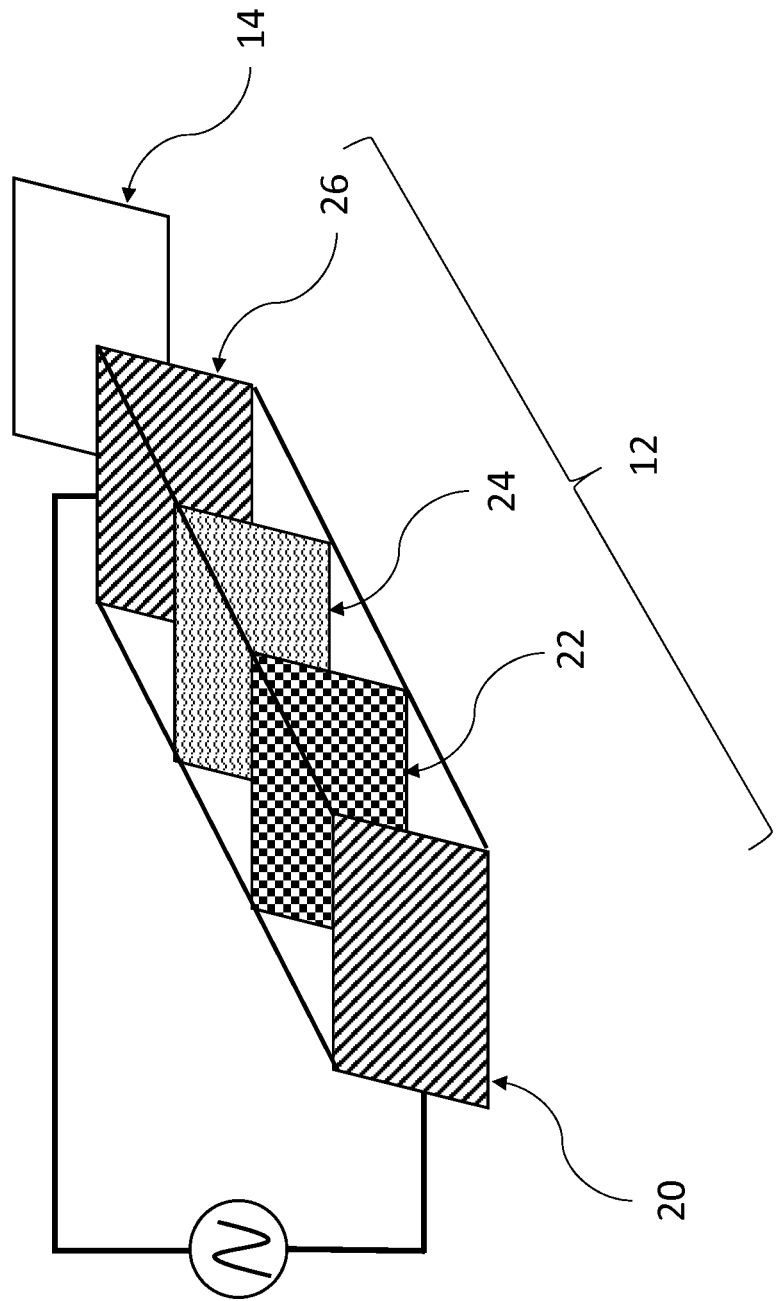
FIG. 2 is a schematic diagram of an active diffuser optical modulator.
Figure 3B:
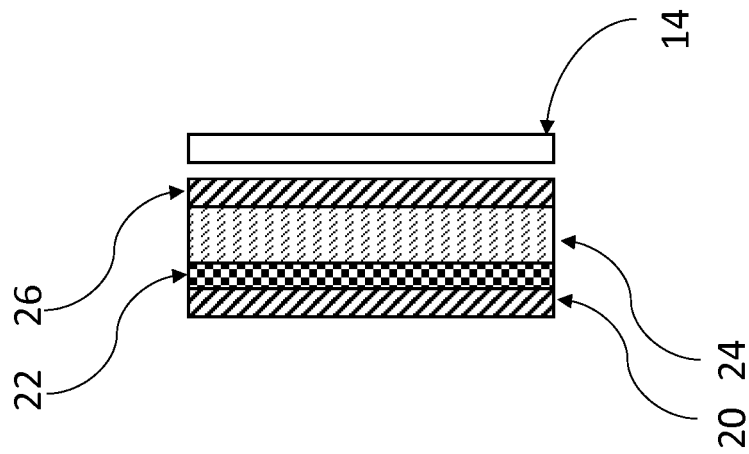
FIG. 3b is a side view of an active diffuser optical modulator when separation layer is not compressed.
Figure 3A:
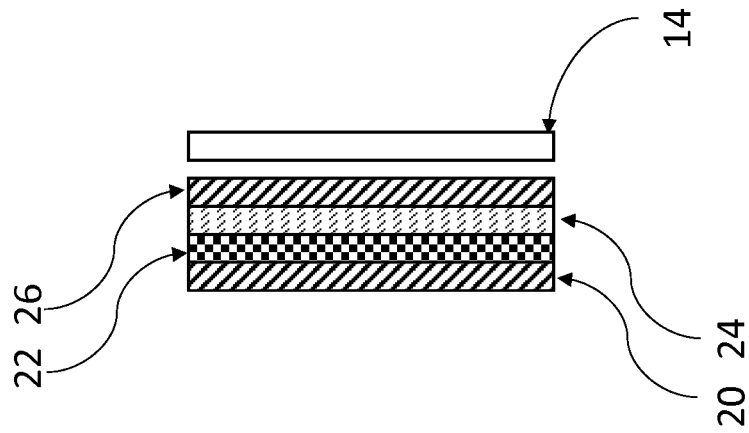
FIG. 3a is a side view of an active diffuser optical modulator when separation layer is compressed.

FIG. 1 represents a perspective view of a laser projection system according to one embodiment. A coherent light source such as a laser projector 10 projects an image through active diffuser optical modulator 12 placed between the projector and a projection screen 14. FIG. 2 is a schematic diagram of one embodiment of the present invention whereby the diffuser element 22 is placed between the first transparent conductor 20 and the separation layer 24. The second conductor 26 is placed between the separation layer 24 and the projection screen 14. An alternating voltage is applied between transparent conductors 20 and 26 to create an attractive Coulomb force between the conductors. FIG. 3a is a side view of an active diffuser optical modulator 12 when separation layer 24 is a compressible layer and is compressed by attractive Coulomb force between the conductors 20 and 26 when a voltage is applied. FIG. 3b is a side view of an active diffuser optical modulator 12 when the compressible separation layer 24 is expanded to its original thickness when no voltage is applied between the conductors 20 and 26.

The conductors 20 and 26 may comprise substantially transparent conductive layers such as metal mesh or transparent conductive layers made of such materials at tin doped indium oxide also known as indium tin oxide or ITO, aluminum zinc oxide also known as AZO, or a conductive polymer (e.g. PEDOT:PSS poly(3,4-ethylenedioxythiophene) polystyrene sulfonate) disposed upon a transparent support. The support for first conductor 20 must be flexible such as PET films, while that of second conductor 26 may be relatively rigid such as glass, polymer sheets, etc.

The diffuser element 22 may be disposed upon the outside of one of the conductors as well. The diffuser moves with the surface of one of the conductors that is free to move while the other conductor is rigid.

In one embodiment, the separator layer may be a micropatterned elastomer to enhance compressibility of the separation layer. The force generated by the voltage is distributed over a smaller area resulting in greater movement in a compressible separation layer have the same Young's modulus.

In another embodiment, the compressibility of the separator layer is enhanced by random placement of isolated beads on the separation layer. Additionally, the compression of the separator layer is not constrained. Rather than compress uniformly, the separation layer deforms around the beads into the air gap created between the conductor and the separation layer by the beads resulting in greater movement at lower applied force.

In another embodiment, the separator layer is an air gap created by random placement of isolated spacer beads between the conductors. In this embodiment, the spacer beads act as tent-poles around which the support film of the transparent conductor elastically deforms when voltage is applied across the conductors. The diffuser elements are disposed on one or both of the surfaces of the conductor that deforms and are moved by the deformation of the conductor support.

In yet another embodiment, the separator layer is an air gap created by random placement of isolated spacer beads on both sides of a flexible support forming an interlayer that is placed between the transparent conductors. The diffuser elements are disposed on one or both of the surfaces of the conductor that deforms the spacer beads between it and the interlayer. Additional diffuser elements may be disposed on one or both of the surfaces of the flexible film which deforms around the spacer beads as the Coulomb forces press the two conductors together.

In yet another embodiment, the second transparent conductor 26 is integrated with the projection screen 14. For example, a conductive polymer such as PEDOT:PSS may be coated over the reflector screen, or included within the reflective coating of the reflector screen.

In yet another embodiment, the second conductor is placed behind the reflective screen. It is desirable to have the reflective screen as thin as possible to minimize the separation between the conductors thus minimizing the voltage required to achieve the Coulomb force needed to move the diffuser sufficient for speckle reduction. One example is white ink coated over metalized polymer film. Another example is a reflective screen made of light scattering components like white pigments such as titanium dioxide and zinc oxide or structural pigments such as porous polymer particles or synthetic mica flakes and a conductive polymer with substantial resistance coated over a highly conductive surface such as a metalized polymer film thereby bringing the second conductor closer to the first while minimizing the resistance and resulting in lower voltages needed to achieve high Coulomb forces.

In yet another embodiment, the projection screen is a rear or back-lit projection screen with the active diffuser element facing the projector. In yet another embodiment, the projection screen is a back-lit projection screen with the active diffuser element facing the observer.

A reflector screen in FIG. 1 or 2 demonstrates an embodiment wherein light scattering particles or voids filled with liquid or gas are placed within the compressible layer and move independently as the layer is compressed to provide additional independent speckle patterns to be average over the cyclic compression further reducing speckle.

A diffuser element may be any element that changes the path of light transmitted through the element and may include randomly patterned and micro patterned transparent films that refract light, coatings of isolated beads on transparent film that act as planoconvex lenses, and coatings of white pigments with high refractive indices such as titanium dioxide and zinc oxide or white structural pigments such as porous polymer particles or synthetic mica flakes that scatter light. Movement of the diffuser results in different paths for the light from the projector to the reflector and to the observer.

Axial movement of the diffuser element as a plane in a direction parallel to the laser source requires a significant displacement to produce a change in the speckle pattern. Movement of the diffuser in this manner produces a change in the path length of the light on two sides of a highly acute triangle resulting in nearly the same overall path length to reach the observer. Movement of about 2 microns is needed to create a half wavelength change in the path length for the conditions cited in the examples below where the observer is placed at 20 degrees from the center line of the laser beam. The triangle becomes more acute as the observer is moved closer to the center light path and greater movement is needed to effect the same speckle reduction. For example, movement of about 3 microns is needed for an observer at 15 degrees and 7 microns for 10 degrees. The number of independent speckle patterns produced by movement of the diffuser should be proportional to the distance moved. Given this, Equation (2) predicts the speckle reduction factor R to be is linear with respect to the square root of the Columbic force applied. The Columbic force is proportional to the square of the applied voltage using a parallel plate geometry thus Equation (2) predicts that the speckle reduction factor R is linear with respect to applied voltage.

The diffuser movement needed to produce sufficient change in the light path length to affect the speckle pattern can be reduced by providing discrete regions through which the path of the projected and reflected light is not changed by the diffuser element in close proximity that is less than the blur spot size of the observer to regions where the light path is changed by the discrete active diffuser element. Micro patterned transparent films, coatings of isolated bead on transparent film, and half-tone printed ink with white pigments are particularly useful as such diffusers. In one embodiment, the isolated beads may occupy 10-70 area % of the transparent film. The area coverage of isolated diffuser beads in discrete active diffusers is estimated from the projected area of the surface weighted mean bead diameter.

For diffuser beads that scatter light in the Mie region, the disturbance of the light is approximately proportional to the projected area of the bead. Thus it is appropriate to characterize the ability of a bead coating to disturb the light path in a diffuser by the surface weighted mean diameter of the beads in the coating.

Surprisingly, the diffuser movement needed to produce a change in the speckle pattern may be also further reduced by distorting the diffuser. The distorted diffuser changes the angle of the light path projected from any point on the diffuser that changes the light path by refraction resulting in projection to a different observer. For areas of the diffuser through which the path of the projected and reflected light is not changed by refraction or scattering, no change in path light in generated by axial movement resulting projection of that light to the same observer. The combination of this light with the same path with light scattered or refracted from different paths as the distortion changes results in a different speckle pattern that reduces speckle when average over the response time of the observer.

There is no expectation of the number of independent speckle patterns produced by axial distortion of the diffuser. In fact, when the active diffuser comprises discrete areas of high reflectivity positioned on a regular pattern with high transparency in other area of the diffuser as is the case in invention EXAMPLES 2 and 6C, the speckle reduction factor R is linear with respect to the square root of the applied voltage. Surprisingly, when the discrete areas are randomly placed porous beads of moderate reflectivity, the value of R is directly linear with respect to the applied voltage. This is also the case for diffusers with either continuous or discrete areas of low reflectivity.

Distortion of the active diffuser may be achieved in a number of manners. Distortion may be provided by a conductor patterned with two or more inter-digitized conductive traces whereby the phasing and amplitude of the voltages applied to each trace are independent. Additionally, a solid compressible layer is more readily deformed in small scale if constant volume is maintained and volume from under the trace to which voltage is applied to may be displaced to under traces where voltage is not applied. The spacing of the conductive traces must be less than the resolution of the human eye to effect a reduction in speckle. The resolution of the human eye varies from individual to individual and with the lighting levels of the viewing environment. The angular resolution that constitutes 20/20 vision in a well lit room is about 1 arcminute at a gain of 10%. In a darkened theater, the pupil dilates and the modulation transfer function (MTF) the eye degrades by about a factor of 3 as the pupil dilates from 2 mm to 6 mm (Andrew B. Watson, "A formula for the mean human optical modulation transfer function as a function of pupil size," *Journal of Vision*, May 2013, Vol. 13, 18). Spacing between conductive traces of 700 microns would result in two conductive traces within 1 arcminute for a viewer seated 5 meters from the projection screen.

Another method of distorting the moving diffuser is to provide hard domains within a compressible separation layer. The amount of movement in-plane of the diffuser will vary with the compressibility of the separation layer as voltage is applied across the two conductors to provide a compression by Coulomb forces.

A different form of distortion may be achieved by integrating the diffuser and the compressible layer. Regions of different refractive index within the compressible separation layer may act as the diffuser element by scattering light. As the layer is compressed, the spacing between these scattering regions throughout the layer changes resulting in different paths of light being projected to the observer. A compressible separation layer with diffuser properties may be obtained with single phase materials having density variations that scatter light such as translucent silicone elastomers. Another method is to provide diffuser properties in the compressible separation layer is with two phase materials where the phases have different refractive indices. The phases may both be continuously intertwined or vesicular or one phase may be discrete regions within the continuum of the other phase. Of particular use is discrete phases comprising a highly deformable material such as a liquid or gas that changes the light scattering properties arising from the shape of the discrete phase.

The compressible layer may be made of any elastomeric material that is transparent and include cross linked silicone, acrylates formulated to provide a high compressibility or low Young's Modulus. The compressibility may be enhanced by a foamed elastomeric material (U.S. Pat. No. 8,410,239 (Blanc et al.)) that also provide a diffuser component. Another method to enhance compressibility of a separation layer is to distribute the Coulomb force generated by the applied voltage across the conductors over a smaller area thereby producing a larger strain in the elastomer resulting in a greater movement of the diffuser element. The force may be concentrated through isolated tent poles of the elastomer by micro-patterning a continuous layer of the elastomer, placing a non-continuous application of elastomer on a support with discrete areas smaller than the required resolution, or distributing hard particles across the surface of the elastomer. The latter method provides both planar movement as well as distortion for flexible conductors and diffuser elements that are in contact with the particles.

The air gap surrounding the hard beads disposed upon the reflector and the second conductor may be considered a compressible separation layer provided the first conductor and diffuser elements are flexible and readily distort. The spacing between the beads may be adjusted to tune the movement and distortion of the diffuser element. Low area coverage of beads are preferred but must be sufficient to prevent the first conductor support from contacting the second conductor and reflector possibly resulting in a short circuit, arcing, or possible "freezing" of the optical modulator, wherein the van der Waals forces of the contact are greater than the restoring force provided by the flexible supports for the first conductor and diffuser elements.

For optical modulators where polydispersed spacer beads are used to form a separation layer, increasing the distortion of the first conductor and diffuser support caused the support to contact the smaller pacer beads and increases the contact area which may lead to localized freezing of the modulator. Beads with a small width index and preferably mondispersed will minimize this freezing effect.

A flexible interlayer of transparent polymer film may be disposed between two layers of hard beads to provide a compressible separation layer for rigid first conductor and diffuser elements. The beads must be randomly disposed on either side at low coverages so that few beads are near the same spot on opposite sides of the flexible interlayer. This flexible interlayer may also serve as a diffuser element to enhance speckle reduction by providing light path changes from refraction and scattering sites that move relative to both the primary diffuser and the reflector. Optimal speckle reduction performance occurs for more open areas in discrete active diffuser through which the path of the projected and reflected light is not changed by refraction or scattering are needed on both the primary diffuser and the flexible interlayer than would for a primary diffuser alone. The observed speckle reduction factor may have a second linear region of lower slope when the flexibility of the interlayer is greatly different than that of the outer diffuser support when applied force exceeds the limit movement or distortion of the more flexible layer. The uniformity of the speckle reduction may still be improved in these conditions when the interlayer is the more flexible material as well as preventing localized freezing of the active diffuser optical modulator due contact to too many areas as described above.

The invention has been described in detail with particular reference to certain preferred embodiments thereof, but it will be understood that variations and modifications can be effected within the scope of the invention.

EXAMPLES

In the characterization of speckle, some authors distinguish between objective and subjective speckle. Speckle patterns are said to be objective when no imaging is involved in their detection, for example, when measured by an optical sensor without a lens. (Even in this case, however, it must be pointed out that the result depends on the size of the sensor elements.) Speckle patterns are said to be subjective when an imaging system is involved in the formation of the final speckle pattern. Such imaging systems may include the human eye, or an electronic camera used for measurement purposes. The statistics of the speckle intensity are sensitive to the parameters of the imaging system used, such as the pupil size, focal length and area of the sensor elements. The perceived contrast of speckle as seen by the human eye is likewise sensitive to the same optical parameters of the human eye. As discussed by Roelandt et. al. in the journal article "Standardized speckle measurement method matched to human speckle perception in laser projection systems", published in Optics Express Vol. 20, No. 8, 8770-8783 (2012), it is necessary to match the optical parameters of the measurement system to those of the human eye when correlating physical measurements to the judgements of observers. At a minimum, the parameters of the measurement system should be fixed and clearly stated, which is the approach taken here.

Following Roelandt et. al., the average size of the speckles in a lens-produced image is given by:

$$A_c = \frac{4\lambda^2 (f/\#)^2}{\pi}, \quad (4)$$

where $\lambda$ is the wavelength and (f/#) is the f-number of the lens (focal length divided by clear aperture). The f-number of the measuring lens determines the observed speckle size relative to the sensor pixel area. If the speckle size is smaller than the sensor pixel size, averaging over speckles (and hence speckle reduction) will occur relative to the objective value of speckle contrast C. The speckle contrast is reduced by the ratio $\sqrt{A_p/A_c}$, where $A_p$ is the area of a camera pixel, compared to the objective value. Therefore it is desirable that the speckle size in the image be larger than the sensor size, so that this ratio remains less than one.

Figure 4:
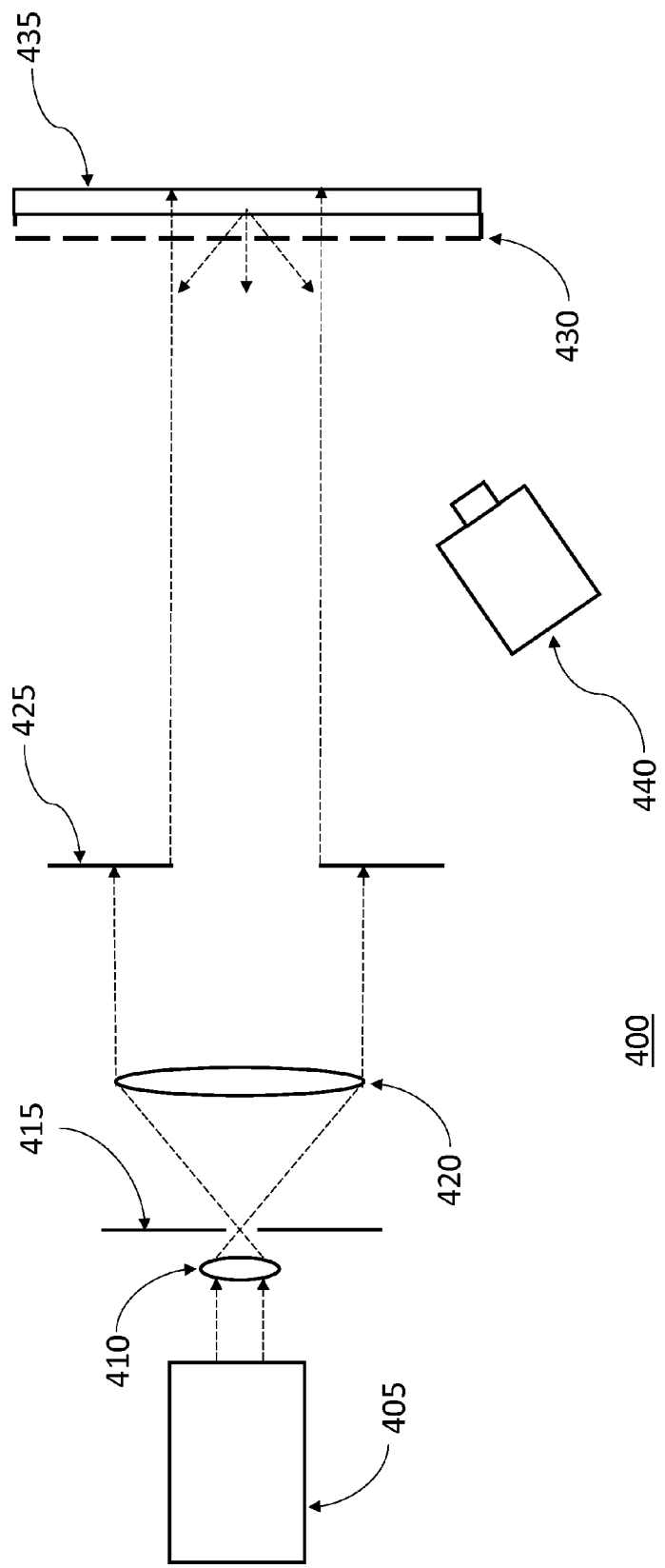
FIG. 4 is a schematic diagram of a system for the quantitative measurement of subjective laser speckle.

FIG. 4 is a schematic diagram of a system 400 for the quantitative measurement of subjective laser speckle. Coherent light from a laser 405 is directed through a lens 410, which brings the beam to a focus through a pinhole 415. This is a standard technique for filtering a laser beam to remove spatial nonuniformities. The beam is then further directed through a collimating lens 420, which produces a nearly parallel beam of light focused at infinity, and directed towards an optical modulator 430 and reflection screen 435. Adjustable iris 425 controls the size of the scattering spot on the optical modulator 430 and screen 435. The speckle pattern is recorded by an electronic camera 440, placed at an angle to the optical axis of the illumination beam. The optical modulator 430 provides reduction of the objective speckle seen by the camera 440 when the modulator is activated.

The electronic camera 440 used in this work was a Point Grey Research GRAS-03K2M 640×480 pixel monochrome camera, operated at 60 frames per second (fps). It was fitted with an Edmund Optics machine vision lens with a focal length of 12 mm, set to f/16 at a working distance of approximately 180 mm at 20 degrees from the center line of the laser beam. The pixel size of the sensor in the Point Grey camera is 7.4 µm. The resulting resolution was 250 microns per pixel. Using Eq. (4) with $\lambda$=0.633 µm, the speckle reduction ratio for measurement is $\sqrt{A_p/A_c}$=0.65. This compares favorably with the ratio of 0.6423 computed by Roelandt et. al. (here adjusted for the wavelength difference of 0.532 µm in their work vs 0.633 µm in our work) for human retinal mosaic pixel area and the typical speckle size in a cinema environment.

Optical modulators constructed from various components were evaluated at different applied peak-to-peak voltages using a sine waveform driven at 60 Hertz. The wave form had little effect on the speckle reduction provided the same peak-to-peak voltages were applied and the movement of the diffuser could respond at the frequency. A slight loss in performance was observed for square and triangle waveforms and for higher frequencies but not for saw tooth waveforms. Frequencies between 60 Hertz and that of the time resolution of the eye (about 40 Hertz caused aliasing with the imaging camera operated at 60 frames per second (fps).

One hundred frame video files were collected by the electronic camera 440 for each test condition. The resulting videos were processed using a 3 frame running average to reduce the impact dark noise and remove the effects of any shifts in the optical modulator on the speckle pattern. The 3 frame running averages were rescaled by the local beam intensity of the filtered image using a 30×30 pixel Gaussian filter having a standard deviation of 7 pixels. The first and second moments over the beam area were accumulated from which the mean C and standard deviation S of the speckle contrast were calculated.

It was found that the performance of an optical modulator could be characterized by a linear response of the static speckle contrast C divided by the active speckle contrast C, hereafter known as the speckle reduction factor R, to either the peak-to-peak voltage (p=1 in Table V) or the square root of the peak-to-peak voltage (p=½ in Table V). The slope of R versus the electric field (peak-to-peak voltage divided by the spacing) characterizes the compressibility of the separation layer giving rise to the movement of the diffuser. The intercept of R versus peak-to-peak voltage was found to be influenced by several factors such aliasing between applied voltage and camera frequency, easy movement and deformation at low applied voltage, particulate contamination or air gaps between layers or interaction from two or more refractions from flexible surfaces. The quality of the optical modulator to reduce speckle was characterized by S the standard deviation of the speckle contrast C. The results of example optical modulators are summarized in Table V below.

The resolution of an optical system may be expressed the frequency at a given gain for system MTF. It is customary to multiply the MTF gains of each optical element of an imaging system to derive the system MTF. While this applies to light collected on a detector passed through a series of lenses or other linear optical devices, it is not certain how the MTF of a non-linear device such as an active diffuser modulator could be separated from the MTF of the reflector screen. At best one can treat the screen as a resolution chart viewed by the camera and estimate the distance at which the screen resolution is greater than that of the human eye.

The impact of the active diffuser optical modulators on the image resolution were subjectively evaluated using a transmission square wave resolution target placed 360 mm from the modulator. While diffraction from the target prevented MTF analysis of the images, visual inspection showed improved edge sharpness resulting in a perceived image resolution improvement when the modulator was active. In some cases, the MTF was estimated using a method similar to ISO 12233, which uses a slanted edge, by placing a razor blade in the beam 60 mm from the optical modulator with the razor edge at an angle of 5.7 degrees to the camera pixels. The resulting MTF was fit with a second order polynomial of the frequency to estimate the frequencies at MTF gains of 50% (MTF50) and 20% (MTF20). Image speckle, spacer beads, and diffuser beads produced strong beat patterns that were interpreted as higher MTF values for some the higher frequencies and in some case a MTF20 could not be estimated. Resolution is typically cited at a gain of 10% but no estimate could be made of the frequency for MTF at 10% gain due to noise induced by speckle. Equivalent resolution of the human eye can be taken from Andrew B. Watson, "A formula for the mean human optical modulation transfer function as a function of pupil size," Journal of Vision, May 2013, Vol. 13, 18 as MTF50's of 13 cycles/degree for pupil dilation of 2 mm and 3 cycles/degree at 6 mm pupil dilation and MTF20's of 40 cycles/degree for pupil dilation of 2 mm and 13 cycles/degree at 6 mm pupil dilation. From this, the distance from the screen can be estimated at a given limit of resolution of the human eye.

Components used to construct example optical modulators are classified as reflectors, conductors, separators, and diffusers and are described as follows:

Reflectors:

Reflectors that were illuminated from the front were either a polyurethane-coated fiberglass screen (VuliteMax), or coatings on nickel plated PET film with a wet thickness of 4 mils of a white ink mixture comprising consisting of equal parts of SunStrato WB MSquared white ink available from Sun Chemical, Extender DPQ-173 available from Sun Chemical, and a diluent comprising a water solution of 4% by weight isopropyl alcohol, 2% by weight 1-methyl-2-pyrrolidone, and 2% by weight N,N-dimethylthanolamine. Backlit reflectors were a wet thickness of 4 mils using the same white ink mixed at 1 part to 11 parts extender and 12 parts diluent coated on transparent support. The front-lit reflectors were held to a rigid steel frame with rare earth magnets providing an immobile reflector surface. The backlit reflectors were held to a steel frame with a hole to pass the laser beam resulting in a flexible reflector that moved when the optical modulator was active.

Conductors:

Conductors consisting of both transparent and opaque nature were used. Transparent conductors used were PEDOT:PSS coated PET and copper gridded PET. The PEDOT:PSS conductor components consisted of 6 mil PET coated with PEDOT:PSS on one side available as Kodak HCF-150 (Cat. No. 190-7591) and 2.5 mil PET coated at 55 C with Heraeus Clevios PEDOT:PSS diluted by equal weight with water and have 0.05% fluorosurfactant using a 1 mil blade and once dry heat treating for 30 minutes at 125 C. Gridded conductor components consisted of 5 mil PET with 8 micron copper lines disposed on each side in a diamond pattern covering 2.5% of the surface. The leads of each side were connected to a contact of nickel-coated PET using conductive lacquer. The opaque conductor used behind reflectors was nickel-coated 4 mil PET.

Separators:

Separators of three forms tested can be categorized as compressible coatings, spacer beads, and flexible interlayers. Compressible coatings where made with Slygard 184 Silicone Elastomer Kit available from Dow Corning. Spacer beads were styrene divinyl benzene polymeric milling media disclosed in U.S. Pat. No. 5,902,711 (Smith et al.) made using the limited coalescence process, with the silica removed and coated in either a reflector, a conductor, or a flexible interlayer. Flexible interlayers were either 1 mil or 2.5 mil PET.

TABLE I

Spacer Beads

| Spacer Bead | Volume Diameter (μm) | Surface Diameter (μm) | Width Index |
|---|---|---|---|
| 1 | 48 | 47 | 1.16 |
| 2 | 141 | 133 | 1.23 |
| 3 | 188 | 179 | 1.24 |
| 4 | 551 | 372 | 1.39 |

Diffusers:

Diffuser elements included Eastman Kodak diffusion sheet Cat 152 1012, a randomly patterned polymer film from EK, PET films coated with beads to refract or scatter light, and 1 mil PET printed with equal parts of SunStrato WB MSquared white ink and Extender DPQ-173 in a 20% half-tone pattern of 150 microns at 45 degree resulting in 80 micron dots and 22% area coverage. Porous beads were made using the method in U.S. Pat. No. 9,029,431 (Nair et al.). The coatings of beads could be disposed on separate films or directly on the transparent conductor or flexible inter layer.

TABLE II

Diffuser Beads

| Diffuser Bead | Surface Diameter (μm) | Shape | Porosity |
|---|---|---|---|
| 1 | 3.5 | Spherical | 45% |
| 2 | 2.1 | Irregular | 0% |
| 3 | 17.8 | Spherical | 20% |

Example 1

Invention EXAMPLE 1 shows the reduction of speckle obtained for a front-lit reflector using a separation layer of Spacer Bead 2 between the first and second conductors. Spacer Bead 2 was coated at about 2.1% area coverage over the white ink coating described in REFLECTORS above coated on a nickel coated PET described in CONDUCTORS above and is the same as that of invention EXAMPLE 5D. This reflector was found to have a MTF50 of 0.8 cycles/mm (equivalent observer distance of 0.9 m for pupil dilation of 2 mm and 0.2 m for pupil dilation of 6 mm) and a MTF20 of 1.2 cycles/mm (equivalent observer distance of 1.9 m for pupil dilation of 2 mm and 0.6 m for pupil dilation of 6 mm). The first conductor was the transparent gridded conductor described in CONDUCTORS above. The diffuser was the EK diffusion sheet with the etched surface towards the camera. The active diffuser optical modulator resolution was found to have a MTF50 of about 0.5 cycles/mm and a MTF20 of 0.8 cycles/mm in both static and dynamic states. A 60 HZ sine wave voltage was applied to the transparent conductor grid toward the reflector while a DC bias was applied to the nickel of the opaque conductor. The DC bias was kept at 20V greater than the one-sided peak of the AC voltage. Good speckle reduction performance was observed with little increase in the S at higher applied voltages. The speckle reduction factor R was found to be linear with the applied voltage up to 2.8 at 700V peak-to-peak above which arcing between the conductors occurred. The summary of speckle reduction performance is given in Table V below.

Example 2

The active diffuser optical modulator in invention EXAMPLE 2 was constructed in the same manner as invention EXAMPLE 1 except that the diffuser was the 1 mil PET printed with white ink described in DIFFUSERS above. The speckle reduction factor R was found to be linear with the square root of the applied voltage up to 2.1 at 700V peak-to-peak at which arcing between the conductors occurred. The resolution and speckle reduction quality were found to be similar to invention EXAMPLE 1.

Examples 3A-E

Invention EXAMPLES 3A-E show the speckle reduction effects of optical modulators constructed in the same manner as in invention EXAMPLE 1 except that the diffusers comprised coatings of solid or porous beads coated as summarized in Table III below on the support of the gridded transparent conductor described in CONDUCTORS above. Invention EXAMPLE 3A comprised a coating of Diffuser Bead 1 coated directly on the support of a gridded conductor on the side toward the camera to achieve approximately 16% area coverage with the beads substantially isolated as single beads using a viscosity modifier in the coating fluid and a latex binder. Lower speckle reduction factor and quality were observed compared to invention EXAMPLE 1 when tested over the same reflector and separator. This loss of performance was attributed to non-uniformity of hand coatings of the diffuser layer. Reversing this element and powering the grid closest to conductor 2 in invention EXAMPLE 3B found a further loss in speckle reduction quality and a lower slope of R. The performance was improved by increasing the area coverage of the diffuser coating to 32% of Diffuser Bead 1 in invention EXAMPLE 3C with a greater slope and maximum R. The beads were no longer substantially isolated as single particles but had numerous groups of 2 and 3 particles resulting in a loss of speckle reduction quality as seen by the greater value of S. Coating each side of a gridded conductor at 16 area % coverage of Diffuser Bead 1 on each side in EXAMPLE 3D further improved the performance but had a non-linear response expressed as a high intercept due to the interaction of light scattered and refracted from the coatings on opposite side of the support. Coating each side of a gridded conductor at 16 area % coverage of Diffuser Bead 2 on each side in EXAMPLE 3E further improved the performance with a linear performance extended to high applied peak-to-peak voltages with a low value of S and a high maximum R.

TABLE III

Invention EXAMPLE 3 Coating Levels

| | Reflector Side | | Camera Side | |
|---|---|---|---|---|
| Example | Dif. Bead | Area % | Dif. Bead | Area % |
| 3A | none | | 1 | 16% |
| 3B | 1 | 16% | none | |
| 3C | none | | 1 | 32% |
| 3D | 1 | 16% | 1 | 16% |
| 3E | 2 | 16% | 2 | 16% |

Example 4

The active diffuser optical modulator in invention EXAMPLE 4 was constructed in the same manner as invention EXAMPLE 3E except that separation layer consisted of a coating of Sylgard 184 approximately 60 microns in thickness disposed upon the reflector as well as the Spacer Bead 2 disposed upon the gridded transparent conductor support used in invention EXAMPLES 7A, 7B and 9 comprising a 1 mil PET interlayer coated with 2.5 area % Spacer Bead 2 and 14 area % Diffuser Bead 2 on the side toward the reflector while the side toward the camera was coated with 16 area % Diffuser Bead 2. While the increased spacing between the conductors required high peak-to-peak voltage Coulomb force, it provided greater electrical insulation between the conductors allowing high voltages without arcing and allowed a greater speckle reduction factor. The slope of the speckle reduction factor R with applied electric field increased while the intercept was less than 1 as the silicone elastomer deformed around the spacer beads.

Example 5A-F

Invention EXAMPLES 5A-F shows the speckle reduction effects of spacer bead size and concentration on front-lit reflectors as summarized in Table IV below. The reflector and conductors were constructed in the same manner as in invention EXAMPLE 1 while the diffuser comprised coatings of diffuser beads on a transparent gridded conduct with 0.67 area % Diffuser Bead 3 on the inside and 16 area % Diffuser Bead 1 on the outside. In invention EXAMPLES 5A, 5C, 5D, and 5F, the projected area covered by the spacer beads was kept approximately constant at about 1.2%. A constant area coverage produces a spacing between the beads that is proportion to bead diameter squared. These conditions gave equivalent speckle reduction for different sized beads but resulted in a greater unit reduction per applied field for larger beads due to greater spacing between the conductors reducing the applied field. The reduced bending moment in longer spans between contact points for larger spacer beads compensated for the reduced field. The low concentration of larger diffuser beads on the inside of the transparent conductor localized locking with the separator beads resulting an increase in S with increasing applied field. At high applied field, the speckle reduction begins to decrease as the area subjected to locking increases.

Increasing concentration of the Spacer Bead 2 in EXAMPLES 5B-D shows increasing intercepts and maximum speckle reduction factor R with small gains in small gains in the slope with applied electric field. The maximum R before locking was greater at high spacer bead concentrations.

Placement of the spacer beads on the deforming element were found to have little effect on speckle reduction performance. In invention EXAMPLE 5G, an active diffuser optical modulator was constructed similar to that used in invention EXAMPLE 5D except that the spacer beads where adhered to the support of the gridded transparent conductor. The support side toward the reflector was coated with 2.5 area % Spacer Bead 2 and 17 area % Diffuser Bead 1 while the side toward the camera was coated with 16 area % Diffuser Bead 1. While this optical modulator had a slightly lower slope, it was tested to higher voltages resulting in a before locking above 560V peak-to-peak giving a higher maximum R.

TABLE IV

Invention EXAMPLE 5 Coating Levels

| Example | Spacer Bead | Area % |
|---|---|---|
| 5A | 1 | 1.3% |
| 5B | 2 | 0.6% |
| 5C | 2 | 1.1% |
| 5D | 2 | 2.1% |
| 5E | 3 | 1.0% |
| 5F | 4 | 0.9% |

Examples 6A-C

Invention EXAMPLES 6A-C shows the effect of 1 mil interlayer and additional spacer beads without (A) and with (B, C) diffuser coatings on the interlayer. The active diffuser optical modulator in invention EXAMPLE 6A was constructed in the same manner as invention EXAMPLE 3E except an interlayer comprising a 1 mil PET coated with 0.8 area % Spacer Bead 1 was placed between the Spacer Bead 1 coated on the reflector and the transparent gridded conductor with the Spacer Bead 1 coating towards the gridded conductor. The interlayer provided a barrier to arcing between the conductors and allowed testing to higher voltages. Rapid deformation of the 1 mil PET in the interlayer resulted in an intercept with the deformation nearly complete at the first applied voltage of 240V peak-to-peak. Deformation of the 5 mil PET support in the transparent conductor at increasing applied voltages increased R but at a slope less than that in invention EXAMPLE 3E. The interlayer increased the field at which locking occurred resulting in a maximum R about the same as invention EXAMPLE 3E but at an improved speckle reduction quality. The value of S decreased with increasing applied field up to the point of locking.

The active diffuser optical modulator in invention EXAMPLE 6B was constructed in the same manner as invention EXAMPLE 6A except a coating 1.6 area % Spacer Bead 1 and 8.7 area % Diffuser Bead 1 was applied on the side toward the transparent gridded conductor and a coating of 4.4 area % Diffuser Bead 1 was applied on the side toward the reflector. The diffuser bead coatings on the interlayer decreased the intercept but prevented the locking up to the maximum voltage test of 1960V peak-to-peak resulting in a very high speckle reduction factor R of good quality at a low value of S.

The active diffuser optical modulator in invention EXAMPLE 6C was constructed in the same manner as invention EXAMPLE 2 except an interlayer comprising a 1 mil PET coated with 0.15 area % Spacer Bead 2 was placed between the Spacer Bead 1 coated on the reflector and the transparent gridded conductor with the Spacer Bead 2 coating towards the gridded conductor. Similar to invention EXAMPLE 2, the speckle reduction factor R was found to be linear with the square root of the applied voltage. Surprisingly, the intercept was reduced to less than 1 but the slope increased by a factor of 2.5. The interlayer allow for testing to the maximum voltage of 1960V peak-to-peak without arcing or locking resulting in high speckle reduction of good quality.

Example 7A-B

Shows the effect of driving two stacked gridded optical modulators with the same wave form in phase and out of phase. The same combined reflector, opaque conductor, and spacer bead element used in invention EXAMPLES 1, 2, 3, and 5D was covered with a coated gridded transparent conductor used in invention EXAMPLES 4 and 9 comprising a 1 mil PET interlayer coated with 2.5 area % Spacer Bead 2 and 14 area % Diffuser Bead 2 on the side toward the reflector while the side toward the camera was coated with 16 area % Diffuser Bead 2. The grid toward the camera side was connected to the DC bias that was applied to the opaque conductor. Over this transparent conductor was place a second transparent conductor element that was used in invention EXAMPLES 3E, 6A, and 6B. A second AC voltage was applied to this second transparent conductor on the grid towards the first transparent conductor having the same peak-to-peak voltage and synchronized with first AC voltage at a phase angle or 0 degrees in invention EXAMPLE 7A and 180 degrees in invention EXAMPLE 7B. This optical modulator was found to have a MTF50 of 0.35 cycles/mm and a MTF20 of 0.6 cycles/mm both static compared to the static MTF values of 0.8 and 1.2 for the reflector alone and 0.45 and 0.7 for the reflector and one gridded transparent conductor/diffuser. The MTF improved slightly when the combined active diffuser modulator activated to MTF50 of 0.4 cycles/mm and a MTF20 of 0.7 cycles/mm. The high values of R were obtained with good speckle reduction quality at 720V peak-to-peak voltages for both. The speckle reduction quality was poor for the 0 degree phase test with S increasing above that of the static image for low applied voltages but improving as the voltage increased. The value of S was about the same as the static image up to 400V peak-to-peak for the 180 degree phase and decreasing above 400V peak-to-peak. Surprisingly, the intercept was found to be less than 1 when the applied AC biases were in phase but was about 1 when the when out of phase.

Example 8

Invention EXAMPLE 8 shows the reduction of speckle obtained using a separation layer of 120 micron beads between the first and second conductors where both conductors are transparent. The VuliteMax A reflector describe in REFLECTORS above was found to have a MTF50 of but structure in the cloth prevented estimating MTF20. Over this reflector the 6 mil PET coated with PEDOT:PSS on one side described above in CONDUCTORS was placed with the conductive side toward the camera. Over this was placed a gridded transparent conductor used in invention EXAMPLE 5G. While this optical modulator had a lower slope than invention EXAMPLE 5G, it was tested to a higher voltage of 720V peak-to-peak without locking resulting good maximum speckle reduction factor R.

Example 9

Invention EXAMPLE 9 shows the reduction of speckle obtained using an interlayer between the first and second conductors where both conductors are transparent. The active diffuser optical modulator was constructed in a similar manner as in invention EXAMPLE 8 using the VuliteMax A reflector and 6 mil PET coated with PEDOT:PSS on one side with the conductive side toward the camera. Over this was placed a 1 mil PET interlayer coated with 2.5 area % Spacer Bead 2 and 14 area % Diffuser Bead 2 on the side toward the reflector while the side toward the camera was coated with 16 area % Diffuser Bead 2 that was using in invention EXAMPLES 7A and 7B. Over the inter layer was placed gridded transparent conductor coated in the same manner as the interlayer.

Example 10

Invention EXAMPLE 10 shows the reduction of speckle obtained when both conductors a continuous coatings of conductive polymer. The reflector and second conductor in invention EXAMPLE 9 was covered with a first transparent conductor element comprising the 2.5 mil PET coated with PEDOT:PSS on both sides upon which was disposed 2.2 area % Spacer Bead 1 and 8.8 area % Diffuser Bead 1 one side and 3.2 area % Diffuser Bead 1 on the second side. The PEDOT:PSS on side with the Spacer Bead 1 was places toward the reflector and was biased the AC voltage. Good speckle reduction was obtained with invention EXAMPLE 10 but the speckle reduction quality was poor due to localized freezing of the active diffuser optical modulator.

Example 11

Invention EXAMPLE 11 shows the improvement in speckle reduction quality when using multiple active diffuser elements in an active diffuser optical modulate. The optical modulator in invention EXAMPLE 10 was covered with another transparent conductor element comprising the 2.5 mil PET coated with PEDOT:PSS on one side upon which was disposed 1.6 area % Spacer Bead 1 while 30 area % Diffuser Bead 2 was disposed upon the uncoated side. The PEDOT:PSS coatings toward the reflector were biased with an AC voltage of the same waveform in phase while the PEDOT:PSS coatings toward the camera were biased a DC voltage that was 20V below the minimum voltage of the AC voltage. Excellent speckle reduction with good speckle reduction quality was obtained with combination of two moving diffuser elements preventing localized freezing of the optical modulator as seen in invention EXAMPLE 10.

Example 12

Invention EXAMPLE 12 shows the reduction of speckle obtained a back lit reflector screen with an active diffuser optical modulator. The diffuser and first conductor was the gridded transparent conductor used in invention EXAMPLE 5G. This was mounted on a metal frame having a hole larger than the expanded laser beam with the spacer beads placed toward the camera and the grid toward the camera biased with the DC voltage. Over this was place the back-lit reflector comprising a transparent gridded conductor described CONDUCTORS above and coated with white ink coating described in REFLECTORS for back-lit reflector. This optical modulator was found to have a MTF50 of 0.6 cycles/mm and a MTF20 of 0.8 cycles/mm both static and when activated. The resolution of the back-lit reflector alone without the diffuser and first conductor was characterized as having a MTF50 1.2 cycles/mm and a MTF20 of 1.6 cycles/mm. Good speckle reduction was observed but with a lower slope. The lower slope for back-lit reflectors is expected as the light travels though the diffuser once compared to twice for a front-lit reflector. Surprisingly, the intercept was found to be less than 1. This low intercept may be due matched distortions in the support of the conductors of equal flexibility. The matched distortions result in equal but opposite refraction angles giving rise to no change in the light path at low distortions.

Comparative Example 1

Comparative EXAMPLE 1 shows that little or no speckle reduction could be derived by placing the optical modulator in the beam before the collimating lens. It was found that only the lowest coatings levels of diffuser beads would deliver enough light to the imaging area on the VuliteMax A reflector. A metal frame with a hole was place midway between the pinhole device and the collimating lens but before the iris. To this was mounted 6 mil PET coated with PEDOT:PSS on one side with the conductive side away from the metal frame and away from the VuliteMax A reflector. This conductive side was biased with the DC voltage to act as the second conductor. The interlayer used in invention EXAMPLE 6B was placed on the conduct with the spacer bead coating toward this conductor and the VuliteMax A reflector. A transparent gridded conductor described CONDUCTORS above was placed over the interlayer and biased with the AC voltage to act was the first conductor. Testing was conducted at only 0 and 720V peak-to-peak resulting in a speckle reduction factor R of 1.02.

Comparative Example 2

Comparative EXAMPLE 2 shows that little or no speckle reduction could be derived by placing the optical modulator before the beam-shaping element and focusing the diffuser beam on the beam-shaping element. Transparent gridded conductors used in invention EXAMPLES 3B and 5G were placed on a metal frame with a hole was place 100 mm from the pinhole device and the collimating lens was moved to focus the diffusive beam to equivalent size on the VuliteMax A reflector. Testing was conducted at only 0 and 800V peak-to-peak resulting in a speckle reduction factor R of 1.03.

Comparative Example 3

In comparative EXAMPLE 3, the separation layer comprised a coating of silicone Sylgard 184 Elastomer at about 35 microns thick over the white ink coating described in REFLECTORS above coated on a nickel coated PET described in CONDUCTORS above. The Young's modulus for Sylgard 184 Elastomer was found to be approximately 0.7 MPa or approximately 100 psi. Over this reflector the 6 mil PET coated with PEDOT:PSS on one side described above in CONDUCTORS was placed with the conductive side toward the reflector. No effect of this optical modulator on speckle was found at any applied AC voltage.

Comparative Example 4

In comparative EXAMPLE 4 the optical modulator was constructed using the VuliteMax A reflector and 6 mil PET coated with PEDOT:PSS on one side with the conductive side toward the reflector so that the 6 mil PET support acted as the separation layer. Another piece of 6 mil PET coated with PEDOT:PSS on one side with the conductive side toward the reflector to act as the first conductor to which the AC bias was applied. Over this was place the EK diffusion sheet described above in DIFFUSERS. Due to the smoothness of the coated PET, air pockets were trapped allowing significant speckle reduction. The air pockets were removed by seasoning the optical modulator at 560V peak-to-peak bias after which no effect of this optical modulator on speckle was found up to the maximum tested AC voltage of 1040V peak-to-peak bias.

Comparative Example 5

The optical modulator in comparative EXAMPLE 5 was constructed in the same manner as invention EXAMPLE 12 except that the back-lit reflector was the diffuser coating in invention EXAMPLE 3C. Testing was conducted at only 0 and 1040V peak-to-peak resulting in a speckle reduction factor R of 1.05.

TABLE V

Optical Modulator Speckle Reduction Performance

| Example | p | R/(V/µm)$^p$ | Intercept R | S | Max R |
|---|---|---|---|---|---|
| INVENTION 1 | 1 | 0.346 | 1.00 | 0.0419 | 2.82 |
| INVENTION 2 | 1/2 | 0.478 | 1.03 | 0.0389 | 2.11 |
| INVENTION 3A | 1 | 0.335 | 1.10 | 0.0607 | 2.08 |
| INVENTION 3B | 1 | 0.267 | 1.11 | 0.0779 | 2.03 |
| INVENTION 3C | 1 | 0.538 | 0.98 | 0.0998 | 2.46 |
| INVENTION 3D | 1 | 0.486 | 1.35 | 0.0590 | 2.64 |
| INVENTION 3E | 1 | 0.459 | 1.13 | 0.0359 | 3.13 |
| INVENTION 4 | 1 | 0.528 | 0.86 | 0.0423 | 3.75 |
| INVENTION 5A | 1 | 0.324 | 1.19 | 0.0796 | 2.01 |
| INVENTION 5B | 1 | 0.411 | 1.04 | 0.0843 | 1.81 |
| INVENTION 5C | 1 | 0.462 | 1.13 | 0.0554 | 2.23 |
| INVENTION 5D | 1 | 0.471 | 1.23 | 0.0657 | 2.44 |
| INVENTION 5E | 1 | 0.536 | 1.10 | 0.0745 | 2.22 |
| INVENTION 5F | 1 | 0.700 | 1.25 | 0.0523 | 2.15 |
| INVENTION 5G | 1 | 0.396 | 1.11 | 0.0410 | 2.76 |
| INVENTION 6A | 1 | 0.355 | 1.75 | 0.0220 | 3.17 |
| INVENTION 6B | 1 | 0.351 | 1.23 | 0.0253 | 4.08 |
| INVENTION 6C | 1/2 | 1.184 | 0.50 | 0.0277 | 3.37 |
| INVENTION 7A | 1 | 0.642 | 0.89 | 0.0235 | 3.71 |
| INVENTION 7B | 1 | 0.645 | 0.97 | 0.0218 | 3.67 |
| INVENTION 8 | 1 | 0.224 | 0.99 | 0.0488 | 2.41 |
| INVENTION 9 | 1 | 0.518 | 1.14 | 0.0391 | 3.18 |
| INVENTION 10 | 1 | 0.138 | 1.16 | 0.0854 | 2.21 |
| INVENTION 11 | 1 | 0.196 | 1.22 | 0.0284 | 4.22 |
| INVENTION 12 | 1 | 0.127 | 0.81 | 0.0494 | 1.98 |
| COMPARATIVE 1 | 1 | 0.0048 | 1.00 | 0.0511 | 1.02 |
| COMPARATIVE 2 | 1 | 0.0044 | 1.00 | 0.0455 | 1.03 |
| COMPARATIVE 3 | 1 | 0.0001 | 0.99 | 0.0377 | 1.00 |
| COMPARATIVE 4 | 1 | 0.0007 | 0.99 | 0.0410 | 1.00 |
| COMPARATIVE 5 | 1 | 0.0054 | 1 | 0.0493 | 1.05 |

PARTS LIST

10 laser projector
12 optical modulator
14 projection screen
20 first conductor
22 diffuser element
24 separation layer
26 second conductor
400 speckle measurement system
405 laser
410 lens
415 pinhole
420 collimating lens
425 adjustable iris
430 optical modulator
435 screen
440 camera

The invention claimed is:

1. An optical modulator for speckle suppression in a laser projection system comprising:
   a first planar transparent conductor;
   a second planar conductor;
   a diffusing element disposed between the first conductor and the second conductor; and
   wherein an alternating voltage applied across the first and second conductors creates in-plane movement and distortion in the diffusing element to reduce laser speckle, the diffusing element comprises beads, and the beads are porous particles.

2. The optical modulator of claim 1 wherein the frequency of movement is greater than 50 Hz.

3. The optical modulator of claim 1 further comprising a separation layer between the first or second conductors and the diffusing element.

4. The optical modulator of claim 3 wherein the separation layer comprises a flexible support.

5. The optical modulator of claim 4 further comprising beads disposed on at least one side of the flexible support.

6. The optical modulator of claim 1 wherein the second conductor is rigid and the first conductor moves relative to the second conductor.

7. The optical modulator of claim 1 further comprising a screen, wherein the spacing between the diffusing element and the screen is less than 1 mm.

8. The optical modulator of claim 1 wherein at least one of the first or second conductors is a wire mesh conductor.

9. The optical modulator of claim 1 wherein at least one of the first or second conductors comprises a conductive polymer.

10. The optical modulator of claim 9 wherein the conductive polymer comprises poly(3,4-ethylenedioxythiophene).

11. The optical modulator of claim 1 wherein the diffuser element comprises discrete areas that diffuse light.

12. The optical modulator of claim 11 wherein the discreet areas that diffuse light are patterned.

13. The optical modulator of claim 1, wherein the second planar conductor is transparent.

14. An optical modulator for speckle suppression in a laser projection system comprising:
   a first planar transparent conductor;
   a second planar conductor; and
   a diffusing element disposed between the first conductor and the second conductor;
   wherein an alternating voltage applied across the first and second conductors creates in-plane movement and distortion in the diffusing element to reduce laser speckle; and
   the optical modulator further comprises a separation layer between the first or second conductors and the diffusing element;
   wherein the separation layer comprises a compressible material that is compressed by an attractive force between the first and second conductors when the voltage is applied across the first and second conductors, and expands to its original thickness when no voltage is applied so as to provide for said in-plane movement.

15. An optical modulator for speckle suppression in a laser projection system comprising:
   a first planar transparent conductor;
   a second planar conductor; and
   a diffusing element disposed between the first conductor and the second conductor;

wherein an alternating voltage applied across the first and second conductors creates in-plane movement and distortion in the diffusing element to reduce laser speckle; and the optical modulator further comprises a separation layer between the first or second conductors and the diffusing element, wherein the separation layer comprises a flexible support and the separation layer further comprises a diffuser disposed on at least one surface.

16. An optical modulator for speckle suppression in a laser projection system comprising:
   a first planar transparent conductor;
   a second transparent planar conductor;
   at least a third optionally transparent conductor;
   at least two diffusing elements, with at least the first diffusing element disposed before the second conductor and a second diffusing element disposed after the second conductor; and
   wherein a first alternating voltage applied across the first and second conductors creates movement in the first diffusing element, and a second alternating voltage applied across the second and third conductors creates movement in the second diffusing element.

17. The optical modulator of claim 16 wherein the first and second alternating voltages have different phases or amplitudes.

* * * * *